United States Patent
Liu et al.

(10) Patent No.: US 10,552,337 B2
(45) Date of Patent: Feb. 4, 2020

(54) MEMORY MANAGEMENT AND DEVICE

(71) Applicant: HUAWEI TECHNOLOGIES CO.,LTD., Shenzhen, Guangdong (CN)

(72) Inventors: Yao Liu, Beijing (CN); Yongbing Huang, Beijing (CN); Mingyu Chen, Beijing (CN); Zehan Cui, Beijing (CN); Licheng Chen, Beijing (CN); Yuan Ruan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 173 days.

(21) Appl. No.: 15/343,693

(22) Filed: Nov. 4, 2016

(65) Prior Publication Data
US 2017/0075818 A1  Mar. 16, 2017

Related U.S. Application Data

(63) Continuation of application No. PCT/CN2015/076664, filed on Apr. 15, 2015.

(30) Foreign Application Priority Data

May 6, 2014 (CN) .......................... 2014 1 0189589

(51) Int. Cl.
*G06F 12/1027* (2016.01)
*G06F 3/06* (2006.01)
*G06F 12/1009* (2016.01)

(52) U.S. Cl.
CPC ........ *G06F 12/1027* (2013.01); *G06F 3/0608* (2013.01); *G06F 3/0619* (2013.01);
(Continued)

(58) Field of Classification Search
CPC ............. G06F 12/1027; G06F 12/1009; G06F 3/0685; G06F 3/0608; G06F 3/0619;
(Continued)

(56) References Cited

U.S. PATENT DOCUMENTS 5,388,244 A 2/1995 Brent et al.
6,145,064 A 11/2000 Long et al.
(Continued)

FOREIGN PATENT DOCUMENTS

CN 101315602 A 12/2008
CN 101539869 A 9/2009
(Continued)

OTHER PUBLICATIONS

Michael B. Taylor: "Virtual Memory—Lecture Notes",Jun. 6, 2008, XP055414707. Retrieved from the Internet: URL:https://cseweb.csd.edu/classes/fa10/cse240a/pdf/08/CSE240A-MBT-L18—VirtualMemory.ppt.pdf {retrieved on Oct. 11, 2017}. total 22 pages.
(Continued)

*Primary Examiner* — Zhuo H Li
(74) *Attorney, Agent, or Firm* — Conley Rose, P.C.

(57) ABSTRACT

A memory management method and a device, where the method includes: receiving a memory access request, where the memory access request carries a virtual address; determining a page fault type of the virtual address if finding, in a translation lookaside buffer TLB and a memory, no page table entry corresponding to the virtual address; allocating a corresponding page to the virtual address if the page fault type of the virtual address is a blank-page-caused page fault, where the blank-page-caused page fault means that no corresponding page is allocated to the virtual address; and updating the page table entry corresponding to the virtual address to the memory and the TLB. The memory manager does not generate a page fault when a blank-page-caused page fault occurs, but allocates a corresponding page to the virtual address. Therefore, a quantity of occurrences of the page fault is reduced, thereby improving memory management efficiency.

20 Claims, 11 Drawing Sheets

(52) U.S. Cl.
CPC .......... *G06F 3/0647* (2013.01); *G06F 3/0652* (2013.01); *G06F 3/0664* (2013.01); *G06F 3/0685* (2013.01); *G06F 12/1009* (2013.01); G06F 2212/684 (2013.01)

(58) Field of Classification Search
CPC .... G06F 3/0652; G06F 3/0664; G06F 3/0647; G06F 2212/684; G06F 2212/1024; G06F 12/08; G06F 12/10; G06F 12/1081; G06F 2212/302
See application file for complete search history.

(56) References Cited

U.S. PATENT DOCUMENTS

| | | | |
|---|---|---|---|
| 6,854,046 | B1 | 2/2005 | Evans et al. |
| 7,623,134 | B1 * | 11/2009 | Danilak .................. G06F 12/08 345/537 |
| 8,156,308 | B1 | 4/2012 | Anvin |
| 2009/0006793 | A1 | 1/2009 | Yamada et al. |
| 2010/0332727 | A1 * | 12/2010 | Kapil ..................... G06F 12/08 711/103 |
| 2013/0117521 | A1 | 5/2013 | Li et al. |
| 2014/0089450 | A1 | 3/2014 | Raindel et al. |
| 2014/0281364 | A1 * | 9/2014 | Buschardt ........... G06F 12/1009 711/207 |
| 2015/0006841 | A1 | 1/2015 | Chen et al. |

FOREIGN PATENT DOCUMENTS

| | | |
|---|---|---|
| CN | 102097128 A | 6/2011 |
| CN | 102169459 A | 8/2011 |
| CN | 102473138 A | 5/2012 |
| CN | 102662860 A | 9/2012 |
| CN | 103488523 A | 1/2014 |
| JP | H07152710 A | 6/1995 |
| JP | H10133950 A | 5/1998 |
| JP | 2002259212 A | 9/2002 |
| JP | 2008225906 A | 9/2008 |
| JP | 2010134584 A | 6/2010 |
| WO | 2013096761 A1 | 6/2013 |
| WO | 2013107393 A1 | 7/2013 |

OTHER PUBLICATIONS

Mohamed A. Shalan, Dynamic Memory Management Forembedded Real-Time Multiprocessorsystem on a Chip, School of Electrical and Computer EngineeringGeorgia Institute of Technology, Nov. 2003. total 118 pages.
Li Ou et al. MRRC: an effective cache for fast memory registration in RDMA, MSST'2006. total 5 pages.
David Roberts et al. NMI: A New Memory Interface to Enable Innovation, HotChips'2010.total 1 pages.
Adrian M. Caulfield et al. QuickSAN: A Storage Area Network for Fast, Distributed,Solid State Disks, ISCA '2013, total 11 pages.
Herbert Walder, Reconfigurable Hardware Operating Systems: From Design Concepts to Realizations , In Proceedings of the 3rd International Conference on Engineering of Reconfigurable Systems and Architectures (ERSA). 2003. total 4 Pages.
Animesh Trivedi et al. RStore: A Direct-Access DRAM-based Data Store, 2015 IEEE 35th International Conference on Distributed Computing Systems, total 12 pages.
Maged M. Michael et al. Scalable Lock-Free Dynamic Memory Allocation, PLDI'04, Jun. 9-11, 2004, total 12 pages.
Rambus, Smart Data Acceleration (SDA) Appliance, Sep. 2015. total 17 pages.
Zsolt Istvan et al. Specialized uservers for the Data Center, EuroSys'2015. total 1 pages.
Jaewoong Sim et al. Transparent Hardware Management of Stacked DRAM as Part of Memory, 2014 47th Annual IEEE/ACM International Symposium on Microarchitecture. total 12 pages.
Pei cao:"introduction to operating system—lecture 17: page faults:putting it together", Mar. 24, 1998,XP55350616,4 pages.
Foreign Communication From a Counterpart Application, Chinese Application No. 15789083.1, Chinese Office Action dated Apr. 16, 2019, 8 pages.
Foreign Communication From a Counterpart Application, European Application No. 15789083.1, European Office Action dated Apr. 16, 2019, 8 pages.

* cited by examiner

MEMORY MANAGEMENT AND DEVICE

CROSS-REFERENCE TO RELATED APPLICATIONS

This application is a continuation of International Application No. PCT/CN2015/076664, filed on Apr. 15, 2015, which claims priority to Chinese Patent Application No. 201410189589.4, filed on May 6, 2014. The disclosures of the aforementioned applications are hereby incorporated by reference in their entireties.

TECHNICAL FIELD

Embodiments of the present disclosure relate to computer technologies, and in particular, to a memory management method and a device.

BACKGROUND

In a modern computer system, a memory management task is jointly implemented by an operating system, a memory management unit (MMU), and a translation lookaside buffer (TLB).

In an existing memory management flow, the operating system is responsible for a vast majority of memory management tasks, and tasks of virtual-physical address mapping and page lookup, which are operated most frequently, are implemented by hardware such as the TLB and the MMU. Such a memory management manner has two inherent bottlenecks: (1) The TLB and the MMU are located in a key path of accessing a cache by a processor, and the processor needs to first access the TLB whenever accessing the cache. Once TLB misses increase, the MMU looks up a page frequently, which is likely to cause a system bottleneck. (2) Page fault processing and binding: Once the MMU fails to look up a page, a page fault is triggered, and the processor spends much time in processing the page fault. An average time for a Linux system to look up a page is 35.8 processing periods, and an average time for the Linux system to process a page fault is 2687 processing periods. If the two bottlenecks can be avoided or a quantity of occurrences of the two bottlenecks can be reduced, memory management efficiency of an entire computer system will be enhanced greatly.

In the prior art, an effective memory management technology is proposed: a virtual indexed virtual tagged cache technology. A main conception of a virtual indexed virtual tagged cache is to remove the hardware such as the TLB and the MMU from the key path of accessing the cache, where a program directly uses a virtual address to index the cache, and the TLB performs virtual-physical address translation only after a cache miss, whereupon a physical address is used to access the cache. The method can shorten the key path of accessing the cache by the processor. In addition, because the TLB is not in the key path of accessing the cache, an extremely large scale of the TLB can be accomplished, and a hit rate of the TLB increases, thereby effectively reducing a quantity of TLB misses. Therefore, the virtual indexed virtual tagged cache can effectively alleviate the first inherent bottleneck mentioned above.

However, a manner of processing a page fault is still bound to the processor. No matter whether the page lookup is performed by the MMU hardware or the operating system, the page fault occurs once the page lookup fails. The processor wastes plenty of time in processing the page fault, which leads to low memory management efficiency.

SUMMARY

Embodiments of the present disclosure provide a memory management method and a device, which can improve memory management efficiency.

A first aspect of the present disclosure provides a memory management method, including:

receiving, by a memory manager, a memory access request, where the memory access request carries a virtual address, and the virtual address is allocated by an operating system to a process when the operating system invokes the process;

determining, by the memory manager, a page fault type of the virtual address if the memory manager finds, in a translation lookaside buffer TLB and a memory, no page table entry corresponding to the virtual address;

allocating, by the memory manager, a corresponding page to the virtual address if the page fault type of the virtual address is a blank-page-caused page fault, where the blank-page-caused page fault means that no corresponding page is allocated to the virtual address; and updating, by the memory manager, a page table entry corresponding to the virtual address to the memory and the TLB, where the page table entry includes a mapping relationship between the virtual address and a physical address of the page.

With reference to the first aspect of the present disclosure, in a first possible implementation manner of the first aspect of the present disclosure, the memory access request further carries a process number of the process, and the memory manager searches, according to the process number, the memory for a page corresponding to the process, and searches, according to the virtual address, the page corresponding to the process for the page table entry corresponding to the virtual address.

With reference to the first aspect of the present disclosure and the first possible implementation manner of the first aspect, in a second possible implementation manner of the first aspect of the present disclosure, the allocating, by the memory manager, a corresponding page to the virtual address includes:

if a blank page exists in the memory, using, by the memory manager, the blank page as the page corresponding to the virtual address; or if no blank page exists in the memory, selecting, by the memory manager, a to-be-substituted page from allocated pages, and changing a virtual address of the to-be-substituted page to the virtual address carried in the memory access request, where the changed to-be-substituted page is the page corresponding to the virtual address.

With reference to the second possible implementation manner of the first aspect of the present disclosure, in a third possible implementation manner of the first aspect of the present disclosure, the method further includes: determining, by the memory manager, whether dirty data exists in the to-be-substituted page; and if no dirty data exists in the to-be-substituted page, changing, by the memory manager, the virtual address of the to-be-substituted page to the virtual address carried in the memory access request; or if dirty data exists in the to-be-substituted page, sending, by the memory manager, address information of the to-be-substituted page to the operating system, such that the operating system migrates data of the to-be-substituted page from the memory to a free position according to the address information of the to-be-substituted page; and after the operating system migrates the data of the to-be-substituted page from the memory to the free position, changing, by the memory manager, the virtual address of the to-be-substituted page to the virtual address carried in the memory access request.

With reference to the second possible implementation manner of the first aspect of the present disclosure, in a fourth possible implementation manner of the first aspect of the present disclosure, the method further includes: determining, by the memory manager, whether dirty data exists in the to-be-substituted page; and if no dirty data exists in the to-be-substituted page, changing, by the memory manager, the virtual address of the to-be-substituted page to the virtual address carried in the memory access request; or if dirty data exists in the to-be-substituted page, migrating, by the memory manager, data of the to-be-substituted page from the memory to a free position according to address information of the to-be-substituted page, where the memory manager and an accessor of the free position are located in a same device, and the accessor of the free position is used to access the free position under control of the memory manager; and after the memory manager migrates the data of the to-be-substituted page from the memory to the free position, changing, by the memory manager, the virtual address of the to-be-substituted page to the virtual address carried in the memory access request.

With reference to the first aspect of the present disclosure, in a fifth possible implementation manner of the first aspect of the present disclosure, the method further includes:

if the page fault type of the virtual address is an existing data page fault, notifying, by the memory manager, the operating system of occurrence of a page fault, where the swap-caused page fault means that a corresponding page has been allocated to the virtual address; and allocating, by the memory manager, the corresponding page to the virtual address, and updating the page table entry corresponding to the virtual address in the memory and the TLB, where the page table entry includes the mapping relationship between the virtual address and the physical address of the page.

With reference to the first aspect of the present disclosure and the first to fifth possible implementation manners of the first aspect, in a sixth possible implementation manner of the first aspect of the present disclosure, if a processor core that executes the process changes, the method further includes:

receiving, by the memory manager, information about a changed processor core that is sent by the operating system.

With reference to the first aspect of the present disclosure and the first to sixth possible implementation manners of the first aspect, in a seventh possible implementation manner of the first aspect of the present disclosure, when the operating system ends the process, the method further includes:

receiving, by the memory manager, a memory freeing instruction sent by the operating system, and freeing, according to the memory freeing instruction, memory space occupied by the process.

With reference to the first aspect of the present disclosure and the first to seventh possible implementation manners of the first aspect, in an eighth possible implementation manner of the first aspect of the present disclosure, the memory manager is integrated in a memory controller or integrated in a buffer scheduler of a message-based memory system.

A second aspect of the present disclosure provides a memory management method, where the method includes:

receiving, by an operating system, address information that is of a to-be-substituted page and sent by a memory manager, and migrating data of the to-be-substituted page from a memory to a free position according to the address information of the to-be-substituted page, where the address information of the to-be-substituted page is sent by the memory manager when dirty data exists in the to-be-substituted page selected for a virtual address carried in a memory access request; and after the operating system migrates the data of the to-be-substituted page from the memory to the free position, notifying, by the operating system, the memory manager that the to-be-substituted page is available, such that the memory manager changes a virtual address of the to-be-substituted page to the virtual address carried in the memory access request.

With reference to the second aspect of the present disclosure, in a first possible implementation manner of the second aspect of the present disclosure, when a page fault occurs, the method further includes:

receiving, by the operating system, a page fault notification sent by the memory manager, and preserve a state according to the page fault notification, where the page fault notification is sent when the memory manager determines that a page fault type of the virtual address is an existing data page fault.

A third aspect of the present disclosure provides a memory manager, including:

a receiving module, configured to receive a memory access request, where the memory access request carries a virtual address, and the virtual address is allocated by an operating system to a process when the operating system invokes the process;

a search module, configured to search a translation lookaside buffer TLB and a memory for a page table entry corresponding to the virtual address;

a determining module, configured to determine a page fault type of the virtual address if the search module finds, in the TLB and the memory, no page table entry corresponding to the virtual address;

a page allocation module, configured to allocate a corresponding page to the virtual address if the page fault type of the virtual address is a blank-page-caused page fault, where the blank-page-caused page fault means that no corresponding page is allocated to the virtual address; and an update module, configured to update a page table entry corresponding to the virtual address to the memory and the TLB after the page allocation module allocates the corresponding page to the virtual address, where the page table entry includes a mapping relationship between the virtual address and a physical address of the page.

With reference to the third aspect of the present disclosure, in a first possible implementation manner of the third aspect of the present disclosure, the memory access request further carries a process number of the process, and the search module is configured to: search, according to the process number, the memory for a page corresponding to the process, and search, according to the virtual address, the page corresponding to the process for the page table entry corresponding to the virtual address.

With reference to the third aspect of the present disclosure and the first possible implementation manner of the third aspect, in a second possible implementation manner of the third aspect of the present disclosure, the page allocation module is specifically configured to:

if a blank page exists in the memory, use the blank page as the page corresponding to the virtual address; or if no blank page exists in the memory, select a to-be-substituted page from allocated pages, and change a virtual address of the to-be-substituted page to the virtual address carried in the memory access request, where the changed to-be-substituted page is the page corresponding to the virtual address.

With reference to the second possible implementation manner of the third aspect of the present disclosure, in a third possible implementation manner of the third aspect of the present disclosure, the page allocation module is configured to:

determine whether dirty data exists in the to-be-substituted page; and if no dirty data exists in the to-be-substituted page, change the virtual address of the to-be-substituted page to the virtual address carried in the memory access request; or if dirty data exists in the to-be-substituted page, send address information of the to-be-substituted page to the operating system, such that the operating system migrates data of the to-be-substituted page from the memory to a free position according to the address information of the to-be-substituted page; and after the operating system migrates the data of the to-be-substituted page from the memory to the free position, change the virtual address of the to-be-substituted page to the virtual address carried in the memory access request.

With reference to the second possible implementation manner of the third aspect of the present disclosure, in a fourth possible implementation manner of the third aspect of the present disclosure, the page allocation module is configured to:

determine whether dirty data exists in the to-be-substituted page; and if no dirty data exists in the to-be-substituted page, change the virtual address of the to-be-substituted page to the virtual address carried in the memory access request; or if dirty data exists in the to-be-substituted page, migrate data of the to-be-substituted page from the memory to a free position according to address information of the to-be-substituted page, where the memory manager and an accessor of the free position are located in a same device, and the accessor of the free position is used to access the free position under control of the memory manager; and after the data of the to-be-substituted page is migrated from the memory to the free position, change the virtual address of the to-be-substituted page to the virtual address carried in the memory access request.

With reference to the third aspect of the present disclosure and the first to fourth possible implementation manners of the third aspect, in a fifth possible implementation manner of the third aspect of the present disclosure, if a processor core that executes the process changes, the receiving module is further configured to:

receive information about a changed processor core that is sent by the operating system.

With reference to the third aspect of the present disclosure and the first to fifth possible implementation manners of the third aspect, in a sixth possible implementation manner of the third aspect of the present disclosure, when the operating system ends the process, the receiving module is further configured to:

receive a memory freeing instruction sent by the operating system; and the memory manager further includes:

a memory freeing module, configured to free, according to the memory freeing instruction, memory space occupied by the process.

With reference to the third aspect of the present disclosure and the first to sixth possible implementation manners of the third aspect, in a seventh possible implementation manner of the third aspect of the present disclosure, the memory manager is integrated in a memory controller or integrated in a buffer scheduler of a message-based memory system.

A fourth aspect of the present disclosure provides an apparatus for implementing memory management, including:

a processor, a memory, and a system bus, where the system bus is used to connect the processor and the memory and implement mutual communication;

the memory is configured to store a computer-executable instruction; and the processor is configured to run the computer-executable instruction to perform the method provided in the first aspect of the present disclosure and the first to eighth possible implementation manners of the first aspect.

A fifth aspect of the present disclosure provides a computer, including a processor, a memory, and a system bus, where the system bus is used to connect the processor and the memory and implement mutual communication;

the memory is configured to store a computer-executable instruction; and the processor is configured to run the computer-executable instruction to perform the method provided in the second aspect of the present disclosure and the first possible implementation manner of the second aspect.

According to the memory management method and a device provided in the embodiments of the present disclosure, when a memory manager finds, in a TLB and a memory, no virtual address carried in a memory access request, the memory manager determines a page fault type of the virtual address; if the page fault type of the virtual address is a blank-page-caused page fault, the memory manager allocates a corresponding page to the virtual address, where the blank-page-caused page fault means that no corresponding page is allocated to the virtual address; and the memory manager updates a page table entry corresponding to the virtual address to the memory and the TLB. By determining the page fault type of the virtual address, the memory manager does not generate a page fault when a blank-page-caused page fault occurs, but allocates a corresponding page to the virtual address. Therefore, the method in the embodiments can reduce a quantity of occurrences of the page fault, thereby improving memory management efficiency.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly and describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

In the prior art, an operating system is responsible for a vast majority of memory management tasks. When the operating system performs memory management, if a page fault occurs, the operating system enters an interrupt service routine, and a processor stops running a current program and shifts to a page fault processing flow. An average time for the processor to process a page fault is 2687 processing periods, which reduces memory management efficiency. This disadvantage in the prior art is primarily caused by binding between the operating system (software) and the processor (hardware).

For the disadvantage of a memory management manner in the prior art, an embodiment of the present disclosure proposes a memory management architecture. In the memory management architecture, memory management tasks are divided, and a virtual address space and a physical address space of a memory are managed separately. The physical address space is managed by a memory manager, and the virtual address space is managed by an operating system. The memory manager primarily manages the following content: address mapping (mapping between a virtual address and a physical address), page maintenance, page allocation, free memory management, page substitution, fragment management, cross-boundary check, protection check, and the like. The operating system primarily manages allocation and freeing of a virtual address.

Figure 1:
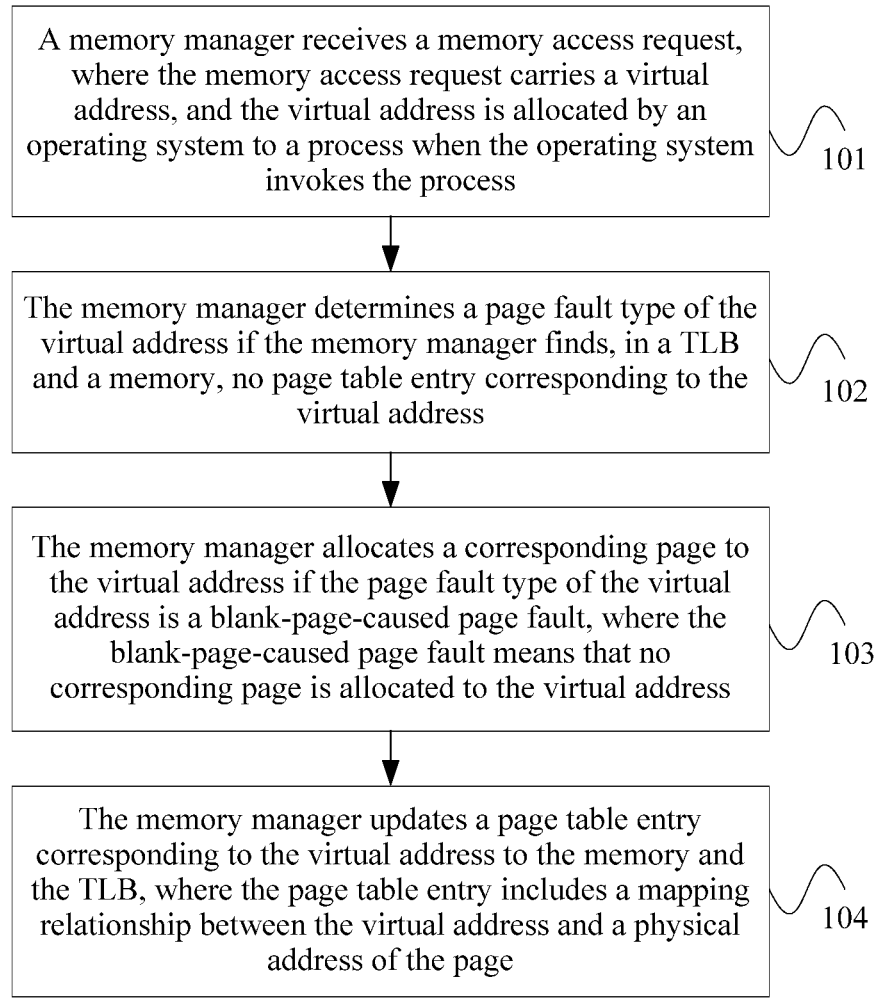
FIG. 1 is a flowchart of a first embodiment of a memory management method according to the present disclosure.

FIG. 1 is a flowchart of a first embodiment of a memory management method according to the present disclosure. The method in this embodiment is performed by a memory manager, where the memory manager may be integrated in hardware that is relatively close to a processor. For example, the memory manager is integrated in a memory controller, or the memory manager is integrated in a buffer scheduler of a message-based memory system. This embodiment does not limit an implementation form of the memory manager. As shown in FIG. 1, the method in this embodiment may include the following steps:

Step 101: The memory manager receives a memory access request, where the memory access request carries a virtual address, and the virtual address is allocated by an operating system to a process when the operating system invokes the process.

The memory access request is sent by the processor, where the processor primarily refers to a core part of a central processing unit (CPU), which may be a CPU core or a set of multiple CPU cores.

Optionally, the memory access request further carries a process number of the process, and the memory manager searches, according to the process number, the memory for a page corresponding to the process, and searches, according to the virtual address, the page corresponding to the process for a page table entry corresponding to the virtual address.

Step 102: The memory manager determines a page fault type of the virtual address if the memory manager finds, in a TLB and a memory, no page table entry corresponding to the virtual address.

After receiving the memory access request, the memory manager searches a local translation lookaside buffer (TLB) for the page table entry corresponding to the virtual address. If the page table entry corresponding to the virtual address does not exist in the TLB, the memory manager searches the memory for the page table entry corresponding to the virtual address. If the memory manager has allocated the corresponding page table entry to the virtual address, the memory manager can find, in the memory, the page table entry corresponding to the virtual address; or if the memory manager has not allocated the corresponding page table entry to the virtual address, the memory manager finds, in the memory, no page table entry corresponding to the virtual address. Generally, the memory manager first searches the TLB for the virtual address, and the memory manager searches the memory for the page table entry corresponding to the virtual address only if the virtual address does not exist in the TLB.

In the prior art, CPU hardware searches the TLB for the virtual address. If the virtual address is not found in the TLB, a memory management unit (MMU) searches a page table. If the MMU finds, in the memory, no page table entry corresponding to the virtual address, the MMU generates a page fault. A main reason for generating the page fault in the prior art is that the operating system has not allocated a blank page properly. When the virtual address is accessed for the first time, because the operating system has not allocated a corresponding page to the virtual address, the MMU finds, in the memory, no page corresponding to the virtual address. According to the method in this embodiment, when the memory manager finds, in the memory and the TLB, no page table entry corresponding to the virtual address, the memory manager does not generate a page fault, but determines the page fault type of the virtual address.

The memory manager may determine the page fault type of the virtual address according to page allocation information, where the page fault type includes a blank-page-caused page fault and an existing data page fault. The blank-page-caused page fault means that no corresponding page is allocated to the virtual address. That is, the virtual address is accessed for the first time and has not been allocated with the corresponding page. The swap-caused page fault means that the corresponding page has been allocated to the virtual address, but the page corresponding to the virtual address has not been used for a long time, and therefore data of the page corresponding to the virtual address is migrated to a free position. The memory manager maintains the page allocation information. In the page allocation information, information about a virtual address of an allocated page is recorded. If that a page has been allocated to the virtual address is recorded in the page allocation information, the memory manager determines that the page fault type is the swap-caused page fault. If no allocation record of the virtual address exists in the page allocation information, the memory manager determines that the page fault type is the blank-page-caused page fault.

Optionally, if the memory manager finds, in the TLB and the memory, no page table entry corresponding to the virtual address, the memory manager needs to further check whether the virtual address is valid. That the memory manager checks whether the virtual address is valid is specifically: the memory manager first checks whether the virtual address crosses a boundary; the memory manager determines whether the virtual address is within a pre-stored virtual address range of the process, and if the virtual address is not within the pre-stored virtual address range, it indicates that the virtual address crosses a boundary and the virtual address is an invalid virtual address. The pre-stored virtual address range of the process on the memory manager is allocated and sent by the operating system, and the operating system is responsible for allocating and managing the virtual address. The virtual address range may include a dynamic virtual address range and a static virtual address range. The static virtual address range is allocated to the process when the operating system creates the process. If virtual addresses in the static virtual address range are not enough for use by the process, the operating system allocates a dynamic virtual address range to the process additionally. If virtual addresses in the static virtual address range are enough for use by the process, the operating system does not allocate a dynamic virtual address range to the process.

In addition, the memory manager not only checks whether the virtual address crosses a boundary, but also needs to check whether the page corresponding to the virtual address is a read-only page. The memory access request is classified into two types: a read access request and a write access request. Permission of a page may be set to read-only. If the permission of the page is set to read-only, only read access can be performed to the page, and write access cannot be performed. For example, when the memory manager determines that the memory access request is a write access request but the page corresponding to the virtual address is a read-only page, the memory manager determines that the virtual address is invalid. If the virtual address meets both the foregoing two conditions, the virtual address is valid. On a precondition that the virtual address is valid, the memory manager further determines the page fault type of the virtual address. If the virtual address does not meet either of the foregoing two conditions, the virtual address is invalid, and the memory manager feeds back invalidity of the virtual address to the operating system.

Step 103: The memory manager allocates a corresponding page to the virtual address if the page fault type of the virtual address is a blank-page-caused page fault, where the blank-page-caused page fault means that no corresponding page is allocated to the virtual address.

That the memory manager allocates a corresponding page to the virtual address is specifically: the memory manager determines whether a blank page exists in the memory; if a blank page exists in the memory, the memory manager uses the blank page as the page corresponding to the virtual address; or if no blank page exists in the memory, the memory manager selects a to-be-substituted page from allocated pages, and changes a virtual address of the to-be-substituted page to the virtual address carried in the memory access request, where the changed to-be-substituted page is the page corresponding to the virtual address. That the memory manager determines whether a blank page exists in the memory is specifically: the memory manager searches a free list, where the free list records all blank pages not occupied in the memory; if a blank page exists in the free list, the memory manager determines that a blank page exists in the memory; or if no blank page exists in the free list, the memory manager determines that no blank page exists in the memory.

If no blank page exists in the memory, it indicates that a physical memory has been exhausted, and the memory manager needs to select a to-be-substituted page from the allocated pages, migrate data of the to-be-substituted page from the memory to a free position, and then allocate the to-be-substituted page to the virtual address for use. When the memory manager selects the to-be-substituted page from the allocated pages, the to-be-substituted page may be selected according to an existing page substitution algorithm, which is not described herein in detail. Generally, the memory manager selects a page that has been unused for a long time as the to-be-substituted page.

After the memory manager selects the to-be-substituted page from the allocated pages, optionally, the memory manager further performs the following operations: The memory manager determines whether dirty data exists in the to-be-substituted page; if no dirty data exists in the to-be-substituted page, the memory manager changes the virtual address of the to-be-substituted page to the virtual address carried in the memory access request. That no dirty data exists in the to-be-substituted page means that the to-be-substituted page is clean, which indicates that the data of the to-be-substituted page has not been modified. If dirty data exists in the to-be-substituted page, the memory manager sends address information of the to-be-substituted page to the operating system, such that the operating system migrates the data of the to-be-substituted page from the memory to the free position according to the address information of the to-be-substituted page. That dirty data exists in the to-be-substituted page means that the to-be-substituted page is dirty, which indicates that the data of the to-be-substituted page has been modified. The address information of the to-be-substituted page may be the virtual address of the to-be-substituted page or a physical address of the to-be-substituted page. After finding the free position first, the operating system starts direct memory access (DMA), and migrates the data of the to-be-substituted page from the memory to the free position by using a DMA accessor.

After the operating system migrates the data of the to-be-substituted page from the memory to the free position, the operating system notifies the memory manager that the to-be-substituted page is available, such that the memory manager changes the virtual address of the to-be-substituted page to the virtual address carried in the memory access request. That the memory manager changes the virtual address of the to-be-substituted page to the virtual address carried in the memory access request means that the memory manager changes a mapping relationship between the virtual address and the physical address of the to-be-substituted page, where the changed to-be-substituted page is a page corresponding to the virtual address carried in the memory access request.

The free position is used to temporarily store data that is unused in the memory. When the physical memory is exhausted, the data that has been unused for a long time in the memory may be migrated to the free position. When data in the free position needs to be invoked, the data may be copied from the free position to the memory for use. The free position in this embodiment may be a SWAP partition. The SWAP partition generally refers to a piece of virtual memory on a disk or a FLASH. In this embodiment of the present disclosure, the SWAP partition may also be located in a nonvolatile memory (NVM). The nonvolatile memory has a large capacity, has a read delay much less than that of a disk and a FLASH, and is extremely suitable for serving as a storage medium of the SWAP partition. Common nonvolatile memories include: a ferroelectric memory, a magnetic random access memory, and a phase change memory (PCM). A speed of reading data from or writing data into the disk or the FLASH by the operating system is much lower than a speed of reading data from or writing data into the NVM. Therefore, when the SWAP partition is provided on the NVM, a time spent by the operating system in migrating the data of the to-be-substituted page from the memory to the free position can be shortened greatly, such that a page allocation time is shortened and memory access efficiency is improved.

In the foregoing manner, when dirty data exists in the to-be-substituted page, the operating system and the memory manager need to collaborate with each other to allocate a corresponding page to the virtual address. In another manner, the memory manager independently allocates a corresponding page to the virtual address without participation of the operating system. Specifically, after the memory manager selects the to-be-substituted page from the allocated pages, the memory manager determines whether dirty data exists in the to-be-substituted page; if no dirty data exists in the to-be-substituted page, the memory manager changes the virtual address of the to-be-substituted page to the virtual address carried in the memory access request; or if dirty data exists in the to-be-substituted page, the memory manager migrates the data of the to-be-substituted page from the memory to the free position according to address information of the to-be-substituted page, where the memory manager and an accessor of the free position (such as a NVM accessor, if the free position is located within a NVM) are located in a same device, and the accessor of the free position is used to access the free position under control of the memory manager; after the memory manager migrates the data of the to-be-substituted page from the memory to the free position, the memory manager changes the virtual address of the to-be-substituted page to the virtual address carried in the memory access request.

In the foregoing two manners, a main difference between the latter manner and the former manner lies in that, in the former manner, when dirty data exists in the to-be-substituted page, the memory manager sends the address information of the to-be-substituted page to the operating system, and the operating system migrates the data of the to-be-substituted page from the memory to the free position according to the address information of the to-be-substituted page; in the latter manner, when dirty data exists in the to-be-substituted page, the memory manager migrates the data of the to-be-substituted page from the memory to the free position according to the address information of the to-be-substituted page.

A precondition of implementing the latter manner is that the memory manager and the accessor of the free position are located in the same device, and the accessor of the free position is used to access the free position under control of the memory manager. When the free position is a disk, the accessor of the free position is a disk controller; when the free position is an NVM, the accessor of the free position is an NVM controller. When the free position is the NVM, both the memory manager and the NVM may be integrated in a memory controller or in a buffer scheduler of a message-based memory system.

Step 104: The memory manager updates a page table entry corresponding to the virtual address to the memory and the TLB, where the page table entry includes a mapping relationship between the virtual address and a physical address of the page.

After allocating the corresponding page to the virtual address, the memory manager updates the TLB and a page table of the memory. Specifically, the memory manager adds the page table entry corresponding to the virtual address to the page table of the memory, and adds the page table entry corresponding to the virtual address to the TLB. After updating the page table entry corresponding to the virtual address to the memory and the TLB, the memory manager can find, in the TLB and the memory, the page table entry corresponding to the virtual address, and then find, according to the page table entry corresponding to the virtual address, a physical address corresponding to the virtual address and use the physical address corresponding to the virtual address to access the memory.

In this embodiment, a memory is managed by using a memory manager. When the memory manager finds, in a TLB and the memory, no page table entry corresponding to a virtual address, the memory manager determines a page fault type of the virtual address. If the page fault type of the virtual address is a blank-page-caused page fault, the memory manager allocates a corresponding page to the virtual address, and updates the page table entry corresponding to the virtual address to the memory and the TLB. In the prior art, a page fault is mostly caused by lack of the corresponding page allocated to the virtual address. According to the method in this embodiment, by determining the page fault type of the virtual address, the memory manager does not generate a page fault when a blank-page-caused page fault occurs, but allocates a corresponding page to the virtual address. Therefore, the method in this embodiment can greatly reduce a quantity of occurrences of the page fault, thereby improving memory management efficiency.

Figure 2:
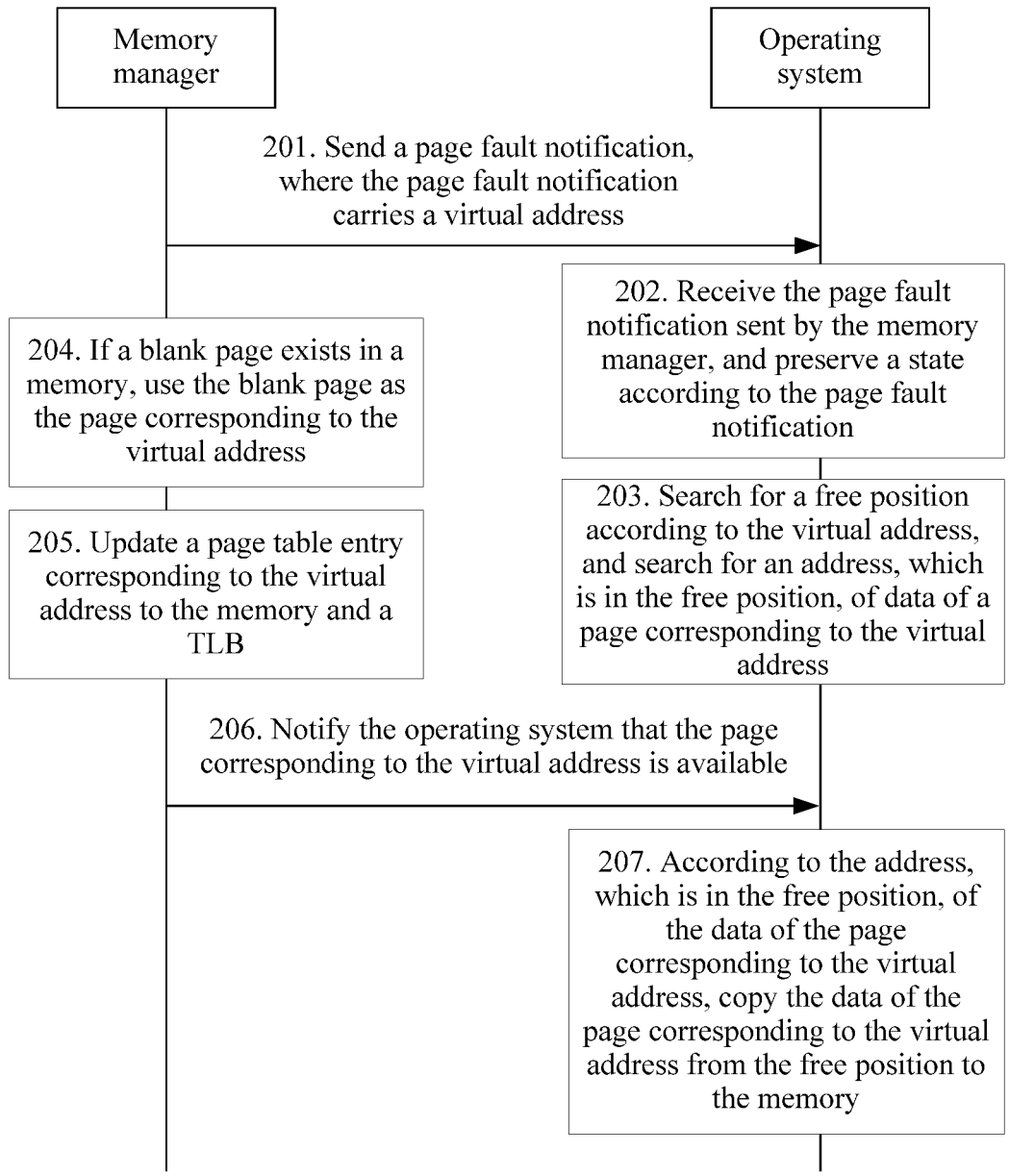
FIG. 2 is a flowchart of a second embodiment of a memory management method according to the present disclosure.

On a basis of the foregoing first embodiment in which when the memory manager determines that the page fault type of the virtual address is an existing data page fault, the memory manager notifies the operating system that a page fault occurs, allocates a corresponding page to the virtual address, and updates the page table entry corresponding to the virtual address in the memory and the TLB, a second embodiment of the present disclosure primarily describes a processing flow after occurrence of the page fault. Compared with the prior art, the method in this embodiment can reduce a processing time of the page fault. FIG. 2 is a flowchart of a second embodiment of a memory management method according to the present disclosure. A precondition of this embodiment is that the memory manager determines that a page fault occurs. For details about a manner of determining the page fault, refer to the description in the first embodiment, and no repeated description is given herein. As shown in FIG. 2, the method in this embodiment may include the following steps:

Step 201: A memory manager sends a page fault notification to an operating system, where the page fault notification carries a virtual address.

The memory manager sends the page fault notification to the operating system when determining that a page fault type of the virtual address is an existing data page fault. In the embodiments of the present disclosure, when a page fault occurs, it indicates that data of a page corresponding to the virtual address has been migrated from a memory to a free position.

Step 202: The operating system receives the page fault notification sent by the memory manager, and preserve a state according to the page fault notification.

Step 203: The operating system searches for a free position according to the virtual address, and searches for an address, which is in the free position, of data of a page corresponding to the virtual address.

Because the data of the page corresponding to the virtual address has been migrated from the memory to the free position, when the virtual address is accessed, the data of the page corresponding to the virtual address needs to be found in the free position and migrated to the memory, such that the data of the page corresponding to the virtual address can continue to be used.

Step 204: If a blank page exists in a memory, the memory manager uses the blank page as the page corresponding to the virtual address.

Step 205: The memory manager updates a page table entry corresponding to the virtual address to the memory and a TLB.

Step 206: The memory manager notifies the operating system that the page corresponding to the virtual address is available.

In the prior art, after a page fault occurs, an operation of allocating a corresponding page to the virtual address is also performed by the operating system. In this embodiment, however, when the operating system performs steps 202 to 203, the memory manager may perform steps 204 to 205 concurrently. Because the operating system and the memory manager can work concurrently, a processing time of the page fault is reduced.

Step 207: According to the address, which is in the free position, of the data of the page corresponding to the virtual address, the operating system copies the data of the page corresponding to the virtual address from the free position to the memory.

After receiving a notification, sent by the memory manager, that the page is available, the operating system copies, according to the address, which is in the free position, of the data of the page corresponding to the virtual address, the data of the page corresponding to the virtual address from the free position to the memory, and then the operating system can schedule a process.

According to the method in this embodiment, when a memory manager determines that a page fault type of a virtual address is an existing data page fault, a page fault occurs, and an operating system is notified that the page fault occurs. The operating system and the memory manager collaborate with each other to execute a page fault processing flow. Because the operating system and the memory manager can work concurrently when performing the page fault processing flow, a processing time of the page fault is reduced, and memory management efficiency is further improved.

Figure 3:
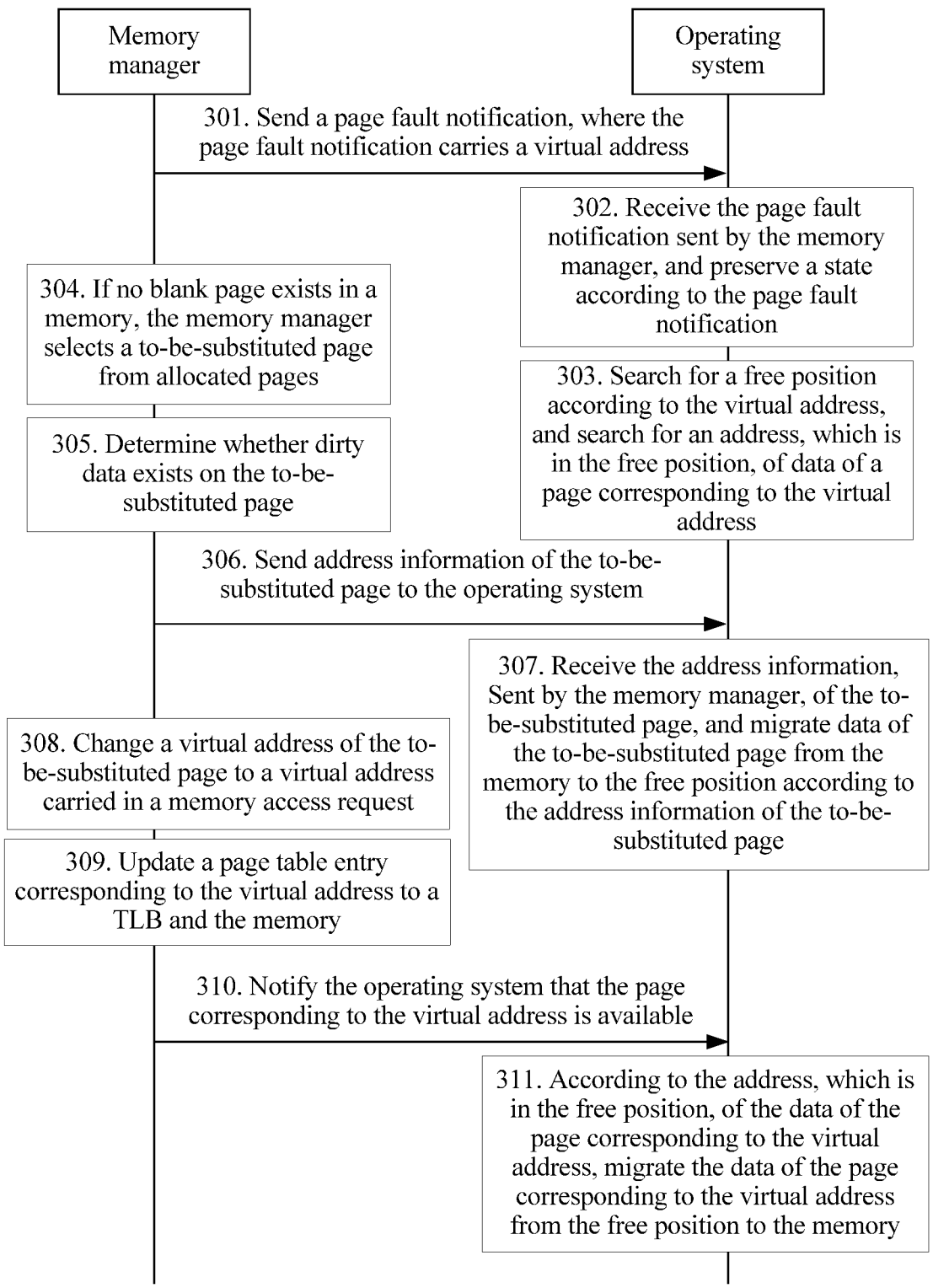
FIG. 3 is a flowchart of a third embodiment of a memory management method according to the present disclosure.

In the second embodiment, an interruption processing flow performed when a blank page exists in the memory for being allocated to the virtual address, that is, a page fault processing flow in a case in which a physical memory is not exhausted, is primarily described. In a third embodiment of the present disclosure, a page fault processing flow performed when the physical memory is exhausted is primarily described. FIG. 3 is a flowchart of a third embodiment of a memory management method according to the present disclosure. As shown in FIG. 3, the method in this embodiment may include the following steps:

Step 301: A memory manager sends a page fault notification to an operating system, where the page fault notification carries a virtual address.

The memory manager sends the page fault notification to the operating system when determining that a page fault type of the virtual address is an existing data page fault.

Step 302: The operating system receives the page fault notification sent by the memory manager, and preserve a state according to the page fault notification.

Step 303: The operating system searches for a free position according to the virtual address, and searches for an address, which in the free position, of data of a page corresponding to the virtual address.

Step 304: If no blank page exists in a memory, the memory manager selects a to-be-substituted page from allocated pages.

Step 305: The memory manager determines whether dirty data exists in the to-be-substituted page.

If dirty data exists in the to-be-substituted page, step 306 is performed; or if no dirty data exists in the to-be-substituted page, steps 308 to 311 are performed.

Step 306: The memory manager sends address information of the to-be-substituted page to the operating system.

In this embodiment, when the operating system performs steps 302 and 303, the memory manager may perform steps 304 and 305 concurrently.

Step 307: The operating system receives the address information, sent by the memory manager, of the to-be-substituted page, and migrates data of the to-be-substituted page from the memory to the free position according to the address information of the to-be-substituted page.

Step 308: The memory manager changes a virtual address of the to-be-substituted page to a virtual address carried in a memory access request.

Step 309: The memory manager updates a page table entry corresponding to the virtual address to a TLB and the memory.

Step 310: The memory manager notifies the operating system that the page corresponding to the virtual address is available.

Step 311: According to the address, which is in the free position, of the data of the page corresponding to the virtual address, the operating system migrates the data of the page corresponding to the virtual address from the free position to the memory.

A fourth embodiment of the present disclosure provides a memory management method. This embodiment differs from the third embodiment in that: when dirty data exists in the to-be-substituted page, the memory manager migrates the data of the to-be-substituted page from the memory to the free position according to the address information of the to-be-substituted page. This embodiment gives description by using an example in which the memory manager and an NVM are integrated in a memory controller. A precondition of this embodiment is that the memory manager determines that a page fault occurs. For details about a manner of determining the page fault, refer to the description in the first embodiment, and no repeated description is given herein.

Figure 4:
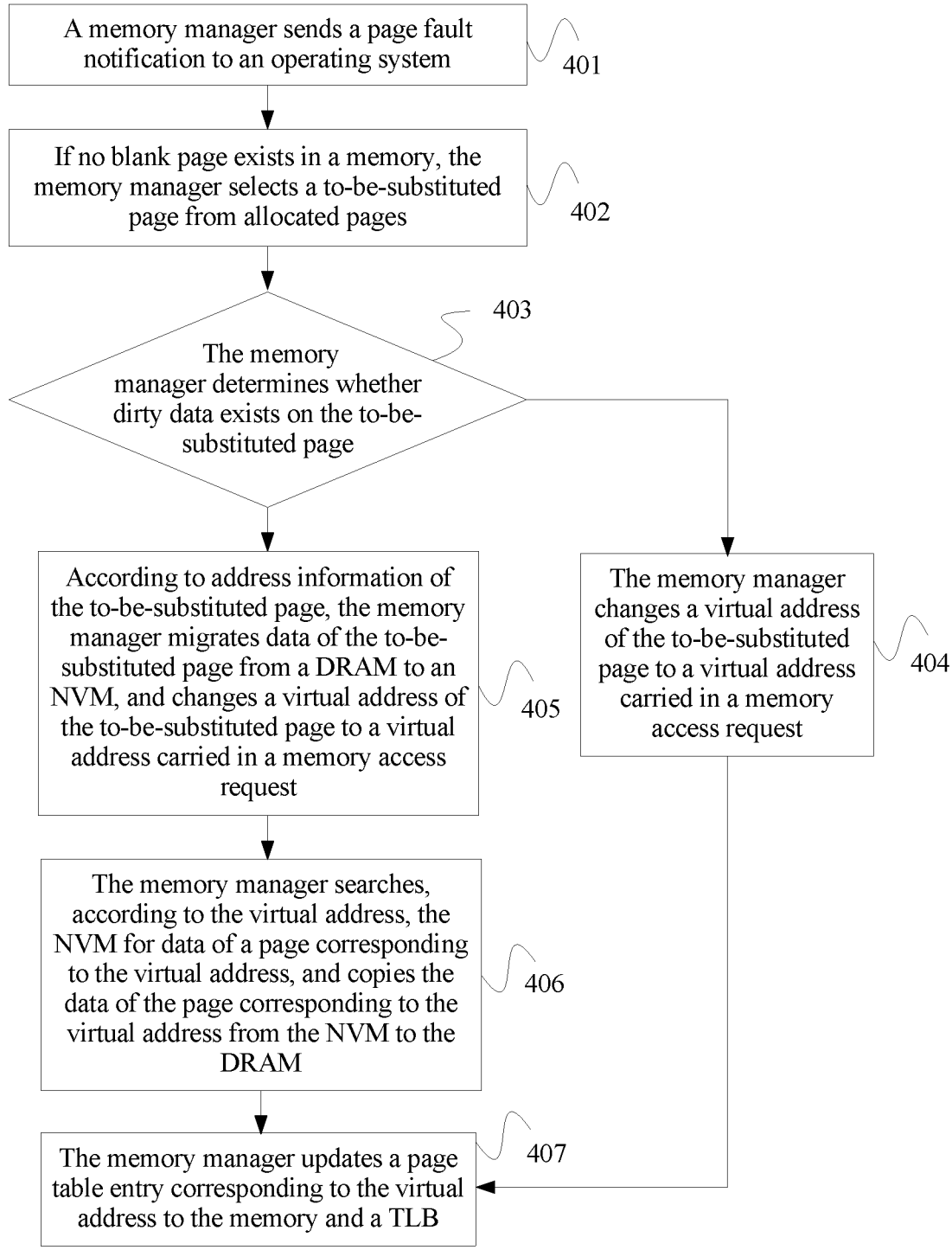
FIG. 4 is a flowchart of a fourth embodiment of a memory management method according to the present disclosure.
Figure 5:
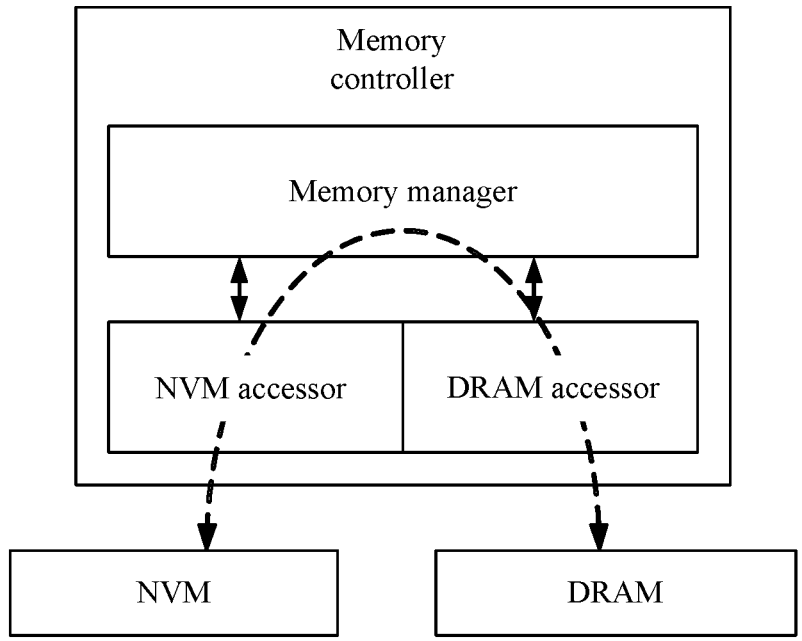
FIG. 5 is a schematic structural diagram of a memory controller according to an embodiment of the present disclosure.

FIG. 5 is a schematic structural diagram of a memory controller according to an embodiment of the present disclosure. As shown in FIG. 5, a memory manager, an NVM accessor, and a dynamic random access memory (DRAM) accessor are integrated in the memory controller. Both the NVM accessor and the DRAM accessor can communicate with the memory manager. The NVM accessor accesses an NVM under control of the memory controller, and the DRAM accessor accesses a DRAM under control of the memory controller. FIG. 4 is a flowchart of a fourth embodiment of a memory management method according to the present disclosure. Referring to FIG. 4 and FIG. 5, the method provided in this embodiment may include the following steps:

Step 401: The memory manager sends a page fault notification to an operating system.

When the memory manager determines that an existing data page fault occurs, the memory manager sends the page fault notification to the operating system, such that the operating system preserve a state according to the page fault notification.

Step 402: If no blank page exists in a memory, the memory manager selects a to-be-substituted page from allocated pages.

Step 403: The memory manager determines whether dirty data exists in the to-be-substituted page.

If no dirty data exists in the to-be-substituted page, step 404 is performed; or if dirty data exists in the to-be-substituted page, step 405 is performed.

Step 404: The memory manager changes a virtual address of the to-be-substituted page to a virtual address carried in a memory access request.

Step 407 is performed after step 404 is performed. The changed to-be-substituted page is a page corresponding to the virtual address.

Step 405: According to address information of the to-be-substituted page, the memory manager migrates data of the to-be-substituted page from the DRAM to the NVM, and changes a virtual address of the to-be-substituted page to a virtual address carried in a memory access request.

The changed to-be-substituted page is the page corresponding to the virtual address.

Specifically, the memory manager searches the NVM for a free area of the NVM. After finding the free area of the NVM, the memory manager instructs a DRAM controller to search, according to the address information of the to-be-substituted page, the DRAM for the data of the to-be-substituted page. After finding the data of the to-be-substituted page, the DRAM controller obtains the data of the to-be-substituted page from the DRAM, and sends the data of the to-be-substituted page to an NVM controller, and the NVM controller writes the data of the to-be-substituted page into the free area of the NVM.

Step 406: The memory manager searches, according to the virtual address, the NVM for data of a page corresponding to the virtual address, and copies the data of the page corresponding to the virtual address from the NVM to the DRAM.

A read delay of reading data from a nonvolatile memory by the memory manager is much less than a read delay of reading data from a disk and a FLASH, and therefore interruption processing time can be reduced.

Step 407: The memory manager updates a page table entry corresponding to the virtual address to the memory and a TLB.

After the memory manager allocates the corresponding page to the virtual address, the memory manager feeds back ending of interruption processing to the operating system, and the operating system performs state restoration and outstacks a state before occurrence of the page fault. A process enters a ready state, and may be scheduled and executed by the operating system any time.

According to the method in this embodiment, when a page fault occurs, the operating system performs only state preservation, and an operation of allocating a corresponding page to the virtual address is solely completed by the memory manager, which alleviates load of the operating system. In an interruption processing process of the operating system, a processor can still perform another operation, which improves usage of the processor.

It should be noted that in the foregoing embodiments, the memory manager may be integrated into a memory controller or integrated into a buffer scheduler of a message-based memory system.

In the foregoing embodiments, the operating system needs to communicate with the memory manager, and two paths need to be added between the memory manager and the processor. One path is a request path, and is used for the operating system to send a memory access request to the memory manager, where an address bus format of the request path is a process number plus a virtual address. The other path is an interaction path, and is used for direct information transmission between the operating system and the memory manager. Information sent by the operating system to the memory manager through the interaction path includes: a process number of a process and a virtual address range of the process, and the operating system may further send information about a processor core used by the process, a property of the process, a physical memory allocation policy, and the like to the memory manager. Information fed back by the memory manager to the operating system through the interaction path includes: a page fault, cross-boundary interruption, protection interruption, page allocation and page substitution information, and the like. The following specifically describes an information interaction process between the operating system and the memory controller.

Figure 6:
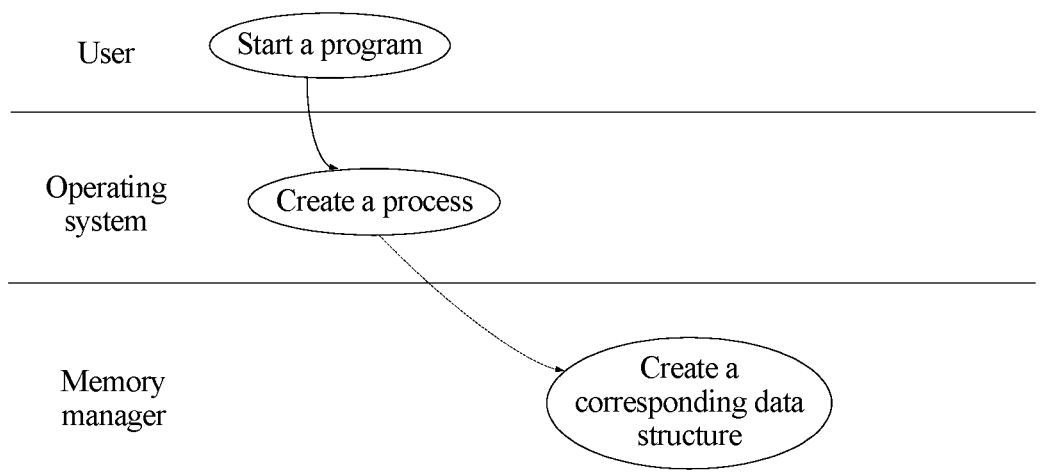
FIG. 6 is a schematic flowchart of creation when an operating system creates a process.

FIG. 6 is a schematic flowchart of creation when an operating system creates a process. As shown in FIG. 6, when a user starts an application, an operating system creates a process for the application, and allocates a virtual address range to the process. After the operating system creates the process successfully, the operating system sends process information to a memory manager. The process information includes a process number of the process and the virtual address range of the process. After receiving the process information, the memory manager creates a corresponding data structure for the process, and stores the process number and the virtual address range.

The virtual address range sent when the operating system creates the process is a static virtual address range. When the virtual address range of the process is insufficient, the operating system may further dynamically allocate a dynamic virtual address range to the process. The virtual address range is used to determine whether a virtual address of the process carried in a memory access request crosses a boundary. The process number is used for the memory manager to search, according to the process number, a memory for a page corresponding to the process. For detailed description, reference may be made to the description in the first embodiment, and no repeated description is given herein.

When a system is a multi-core system or a many-core system, the operating system further needs to send, to the memory manager, information about a processor core used by the process, such as an ID of the processor core, such that information is sent to the processor core according to the ID of the processor core when the memory manager interacts with the operating system. If the processor core that executes the process changes, the operating system further sends information about a changed processor core to the memory manager.

Figure 7:
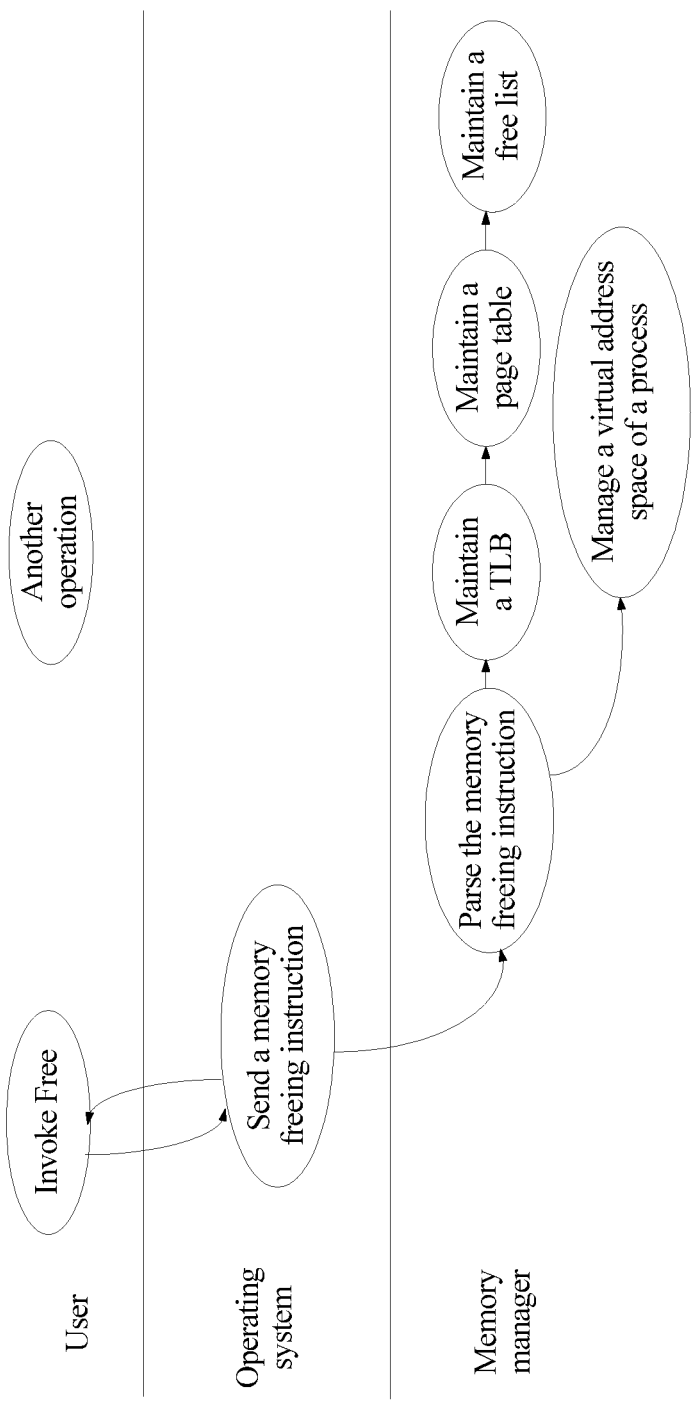
FIG. 7 is a schematic flowchart of ending a process by an operating system.

FIG. 7 is a schematic flowchart of ending a process by an operating system. As shown in FIG. 7, when a user ends a program, a Free function is invoked. The Free function is a memory freeing function. When receiving the Free function, an operating system sends a memory freeing instruction to a memory manager. After receiving the memory freeing instruction, the memory manager parses the memory freeing instruction, and then maintains a TLB, a page table, and a free list, and manages a virtual address space of a process. Maintaining the TLB and the page table specifically refers to deleting a virtual address range corresponding to the process from the TLB and the page table, that is, freeing the virtual address space occupied by the process. Maintaining the free list refers to updating a page corresponding to the virtual address space to the free list after the memory manager frees the virtual address space occupied by the process.

When the process is ended, the operating system needs only to send a memory freeing instruction to the memory manager, and all subsequent memory management operations are performed by the memory manager. When the memory manager performs the subsequent memory management operations, the operating system may run another user program concurrently. In the prior art, however, when the process is ended, all memory management operations are performed by the operating system. According to the method in this embodiment, the user program may be run concurrently when the memory management operations are performed, which can improve utilization of a processor.

The following describes several typical application scenarios of a memory management method according to an embodiment of the present disclosure.

Figure 8:
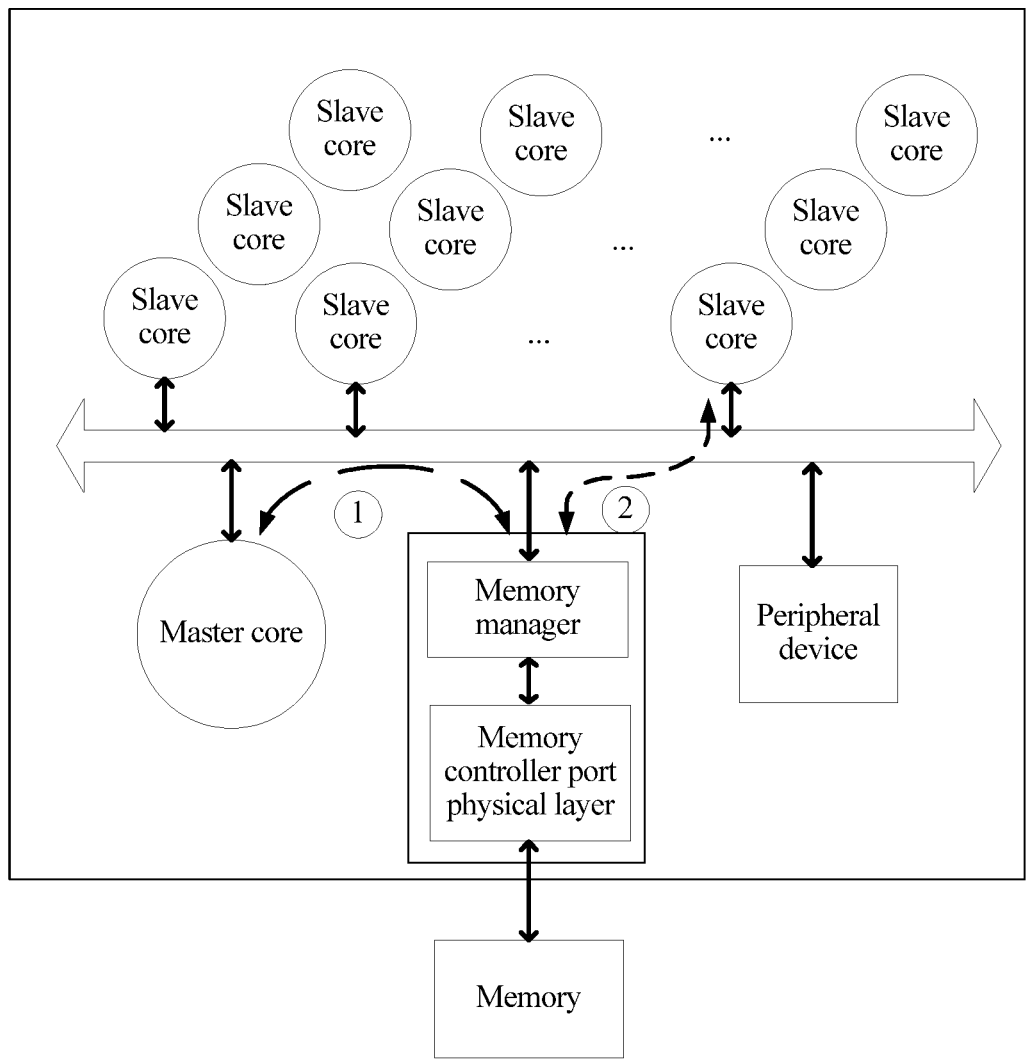
FIG. 8 is a schematic structural diagram of a many-core processor system.

The memory management method provided in the embodiment of the present disclosure may be applied to design of various processors, including a single-core processor, a multi-core processor, and a many-core processor. In a multi-core processor system and a many-core processor system, processors may be homogeneous processors or may be heterogeneous processors. FIG. 8 is a schematic structural diagram of a many-core processor system. The many-core processor system includes a master core, multiple slave cores, a memory controller, a peripheral device, and a memory. The master core is mutually connected to multiple slave cores by using a bus. A memory manager is integrated into the memory controller. The memory manager is connected to the memory by using a memory controller port physical layer (MC PHY). The memory manager may centrally manage physical address spaces of all processor cores on a chip. The master core may manage memory space of an entire processor core along a path ① in the diagram by coordinating with the memory manager. Each slave core can manage its private memory space along a path ② in the diagram by coordinating with the memory manager.

In addition, because a virtual indexed virtual tagged cache technology is applied, each processor core no longer requires a TLB and an MMU, and design of the processor core is simplified greatly. In addition, all memory management tasks of a physical address space are performed by the memory manager, which alleviates memory management task load of the operating system on each processor core and greatly simplifies software design of the many-core processor system.

Figure 9:
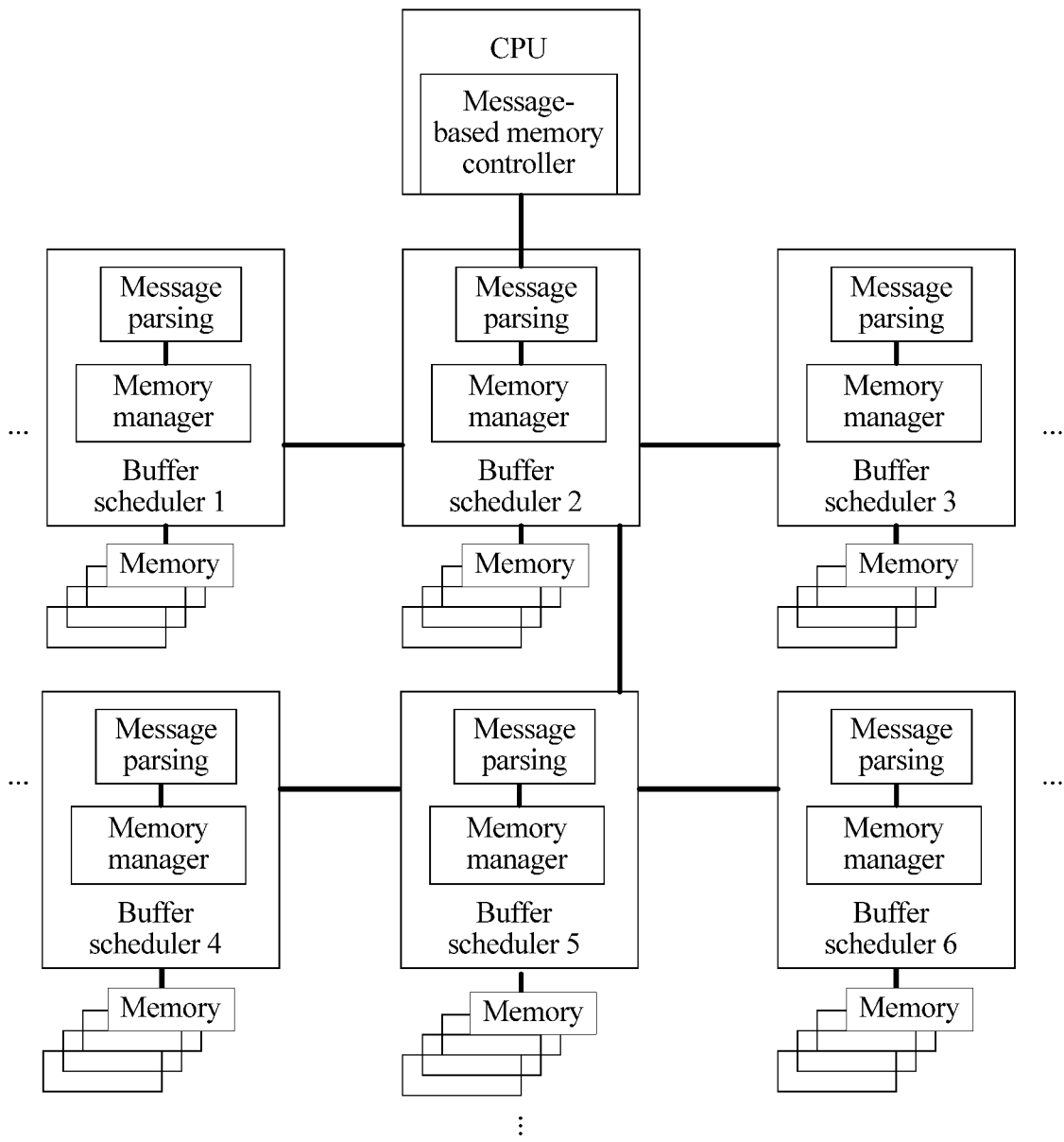
FIG. 9 is a schematic structural diagram of a message-based memory system.

The memory management method provided in the embodiment of the present disclosure may also be applied to a message-based memory system. FIG. 9 is a schematic structural diagram of a message-based memory system. As shown in FIG. 9, a message-based memory controller is integrated into a CPU. The CPU sends a message-based memory access request to a buffer scheduler by using a message channel, where the message channel uses a high speed serial bus. A message parsing unit in the buffer scheduler may parse the message-based memory access request, and the buffer scheduler performs scheduling and buffering on plenty of message-based memory access requests, such that a memory channel can be used efficiently. Multiple buffer schedulers are cascaded by using the message channel, so as to form a memory system of an ultra-large capacity. Each buffer scheduler may invoke a part of memory of the memory system. The part of memory system that is invoked by each buffer scheduler is referred to as a memory subsystem.

To implement the method in each embodiment of the present disclosure, a memory manager may be integrated into each buffer scheduler. Each buffer scheduler may independently manage its memory subsystem. Therefore, each buffer scheduler may select a proper memory management manner according to its requirements, so as to ensure highest use efficiency of the entire memory system.

Figure 10:
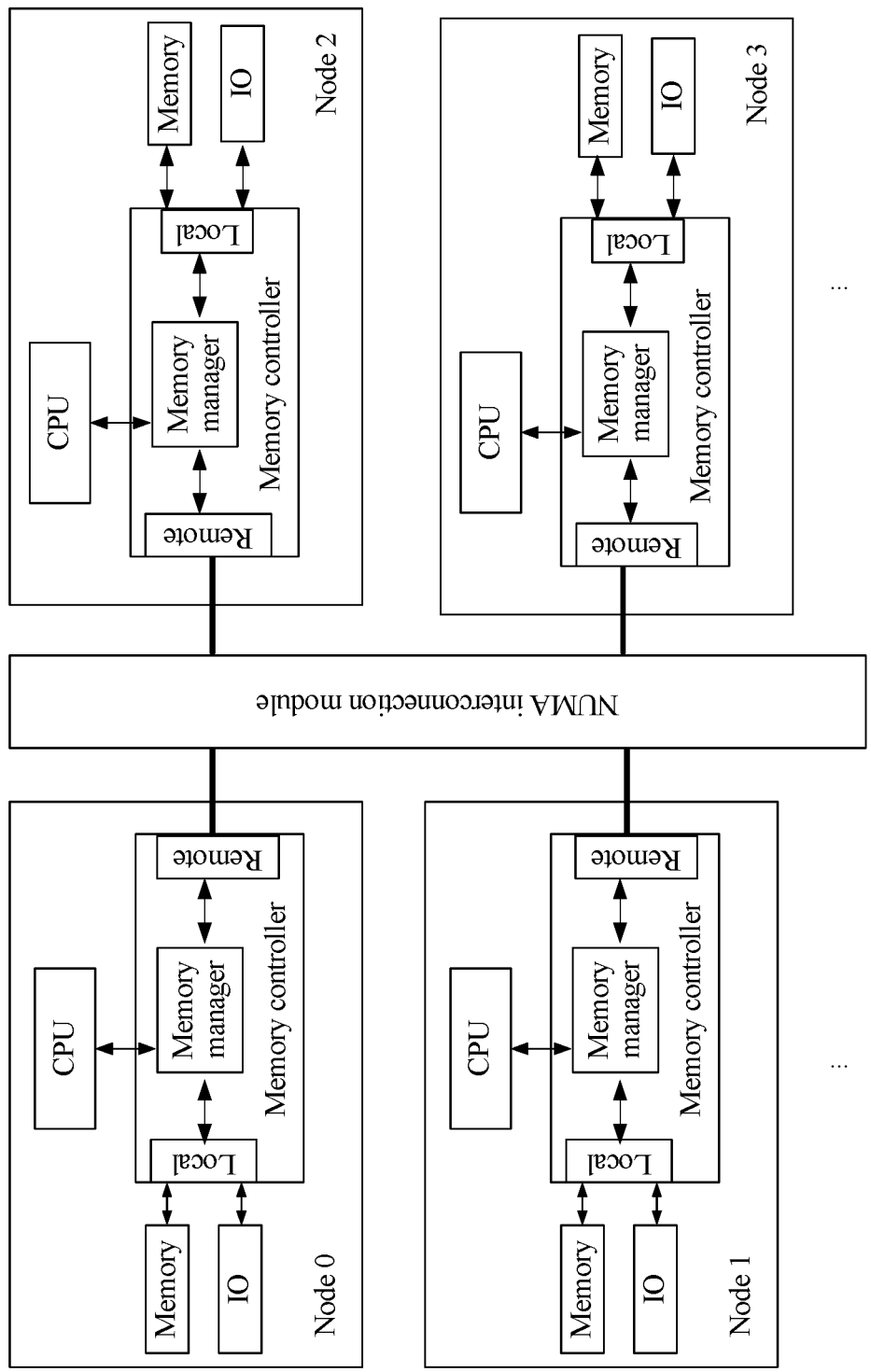
FIG. 10 is a schematic structural diagram of a NUMA system.

The memory management method provided in the embodiment of the present disclosure may also be applied to a non-uniform memory access architecture (NUMA) system. FIG. 10 is a schematic structural diagram of a NUMA system. As shown in FIG. 10, the NUMA system includes four nodes: a node 0, a node 1, a node 2, and a node 3. The nodes are connected by using an NUMA interconnection module, and each node includes a CPU, a memory controller, a memory, and an IO interface. The memory controller of each node can access a memory of the node by using a local interface, and may further access a memory of another node by using a remote interface.

To implement the methods in the embodiments of the present disclosure, a memory manager may be integrated into the memory controller of each node. The memory manager of each node is responsible for managing a local physical address space, and is capable of accessing a memory of a remote node. If a local memory manager needs to access remote memory space, the local memory manager needs to send a memory access request to a memory manager of a remote node by using a remote interface, and the memory manager of the remote node performs actual management tasks such as page allocation. In the NUMA system, interaction performed between the memory managers of different nodes is transparent to an operating system. This solution can alleviate management burden of the operating system and improve memory management efficiency of the NUMA system.

Figure 11:
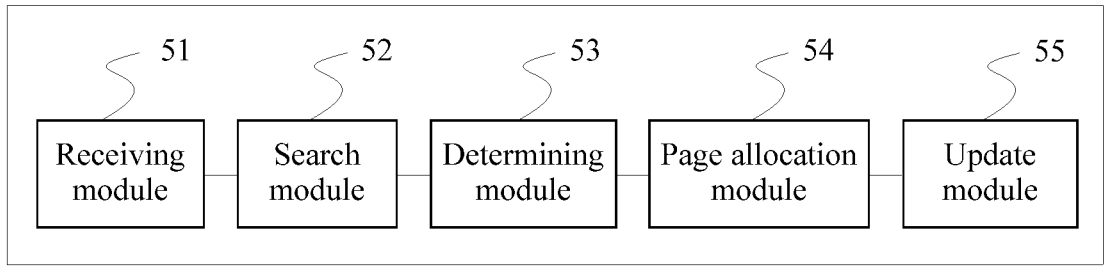
FIG. 11 is a schematic structural diagram of a memory manager according to an embodiment of the present disclosure.

FIG. 11 is a schematic structural diagram of a memory manager according to an embodiment of the present disclosure. The memory manager may be integrated into a memory controller or integrated into a buffer scheduler of a message-based memory system. As shown in FIG. 11, the memory manager in this embodiment includes a receiving module 51, a search module 52, a determining module 53, a page allocation module 54, and an update module 55.

The receiving module 51 is configured to receive a memory access request, where the memory access request carries a virtual address, and the virtual address is allocated by an operating system to a process when the operating system invokes the process.

The search module 52 is configured to: search, according to the virtual address carried in the memory access request, a translation lookaside buffer TLB and a memory for a page table entry corresponding to the virtual address.

The determining module 53 is configured to determine a page fault type of the virtual address if the search module 52 finds, in the TLB and the memory, no page table entry corresponding to the virtual address.

The page allocation module 54 is configured to allocate a corresponding page to the virtual address if the page fault type of the virtual address is a blank-page-caused page fault, where the blank-page-caused page fault means that no corresponding page is allocated to the virtual address.

The update module 55 is configured to update a page table entry corresponding to the virtual address to the memory and the TLB after the page allocation module 54 allocates the corresponding page to the virtual address, where the page table entry includes a mapping relationship between the virtual address and a physical address of the page.

Optionally, the memory access request further carries a process number of the process, and the search module 52 is configured to: search, according to the process number, the memory for a page corresponding to the process, and search, according to the virtual address, the page corresponding to the process for the page table entry corresponding to the virtual address.

The page allocation module 54 is specifically configured to: if a blank page exists in the memory, use the blank page as the page corresponding to the virtual address; or if no blank page exists in the memory, select a to-be-substituted page from allocated pages, and change a virtual address of the to-be-substituted page to the virtual address carried in the memory access request, where the changed to-be-substituted page is the page corresponding to the virtual address.

If no blank page exists in the memory, after the memory manager selects a to-be-substituted page, the page allocation module 54 is configured to: determine whether dirty data exists in the to-be-substituted page; and if no dirty data exists in the to-be-substituted page, change the virtual address of the to-be-substituted page to the virtual address carried in the memory access request; or if dirty data exists in the to-be-substituted page, send address information of the to-be-substituted page to the operating system, such that the operating system migrates data of the to-be-substituted page from the memory to a free position according to the address information of the to-be-substituted page; and after the operating system migrates the data of the to-be-substituted page from the memory to the free position, change the virtual address of the to-be-substituted page to the virtual address carried in the memory access request.

In the foregoing manner, when dirty data exists in the to-be-substituted page, the operating system and the memory manager need to collaborate with each other to allocate a corresponding page to the virtual address. In another manner, the memory manager independently allocates a corresponding page to the virtual address without participation of the operating system. Specifically, the page allocation module is further configured to: determine whether dirty data exists in the to-be-substituted page; and if no dirty data exists in the to-be-substituted page, change the virtual address of the to-be-substituted page to the virtual address carried in the memory access request; or if dirty data exists in the to-be-substituted page, migrate data of the to-be-substituted page from the memory to a free position according to address information of the to-be-substituted page, where the memory manager and an accessor of the free position are located in a same device, and the accessor of the free position is used to access the free position under control of the memory manager; and after the data of the to-be-substituted page is migrated from the memory to the free position, change the virtual address of the to-be-substituted page to the virtual address carried in the memory access request. In the latter manner, an operation of migrating the data of the to-be-substituted page from the memory to the free position is performed by the memory manager, without participation of the operating system.

The memory manager in this embodiment may be used to implement the method in any embodiment shown in FIG. 1 to FIG. 4, and specific implementation manners and technical effects are similar and are not described herein again.

Figure 12:
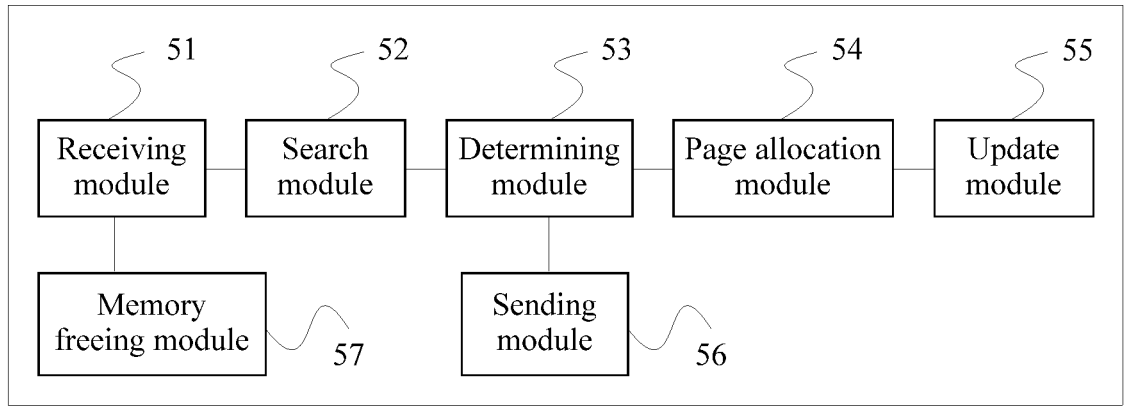
FIG. 12 is a schematic structural diagram of another memory manager according to an embodiment of the present disclosure.

FIG. 12 is a schematic structural diagram of another memory manager according to an embodiment of the present disclosure. As shown in FIG. 12, on a basis of the structure shown in FIG. 11, the memory manager in this embodiment further includes a sending module 56, configured to: if the page fault type of the virtual address is an existing data page fault, notify the operating system of occurrence of a page fault, where the swap-caused page fault means that a corresponding page has been allocated to the virtual address; the page allocation module 54 is further configured to allocate the corresponding page to the virtual address; and the update module 55 is further configured to update the page table entry corresponding to the virtual address in the memory and the TLB, where the page table entry includes the mapping relationship between the virtual address and the physical address of the page.

After the determining module 53 determines that the page fault type of the virtual address is an existing data page fault, the memory manager notifies the operating system of occurrence of a page fault, and the operating system preserves a state and enters a page fault processing flow. After the page fault occurs, the memory manager allocates the corresponding page to the virtual address. A page allocation flow is basically the same as a page allocation flow performed when a blank-page-caused page fault occurs, but differs in that: when a page fault occurs, the operating system can invoke data of the page corresponding to the virtual address only if the memory manager further obtains the data of the page corresponding to the virtual address from the free position and returns the data back to the memory.

When a system is a multi-core system or a many-core system, if a processor core that executes the process changes, the operating system further sends information about a changed processor core to the memory manager. The receiving module 51 is further configured to receive the information about the changed processor core that is sent by the operating system.

When the operating system ends the process, the receiving module 51 is further configured to: receive a memory freeing instruction sent by the operating system, where the memory freeing instruction is used to instruct the memory manager to free a memory; correspondingly, the memory manager further includes a memory freeing module 57, configured to: free, according to the memory freeing instruction, memory space occupied by the process.

The apparatus in this embodiment may be used to implement the technical solutions in the method embodiments in FIG. 1 to FIG. 4, and implementation principles and technical effects thereof are similar and are not described herein again.

Figure 13:
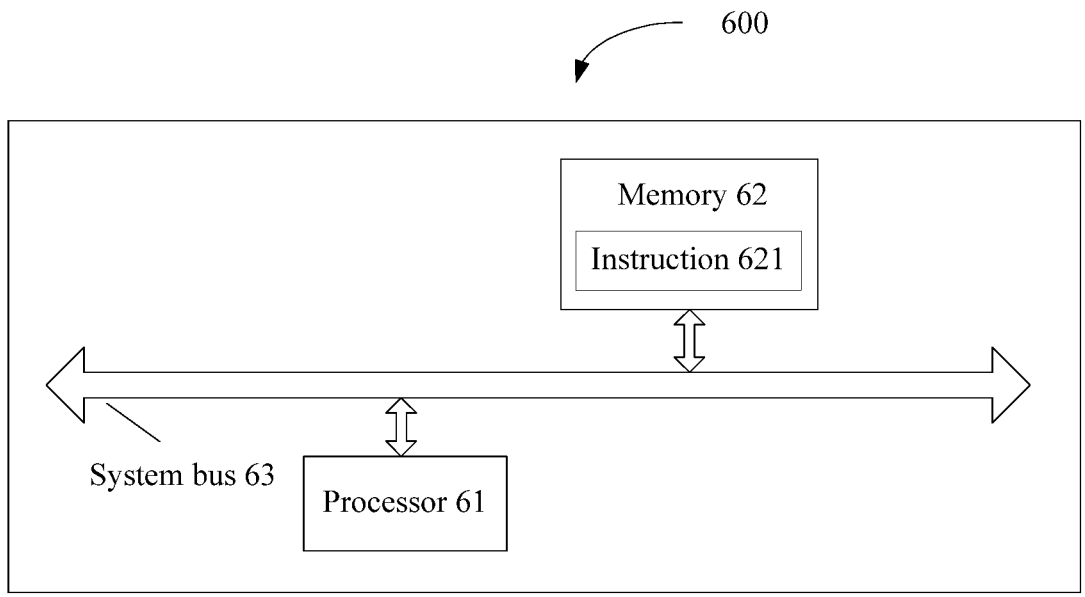
FIG. 13 is a schematic structural diagram of an apparatus for implementing memory management according to an embodiment of the present disclosure.

FIG. 13 is a schematic structural diagram of an apparatus for implementing memory management according to an embodiment of the present disclosure. As shown in FIG. 13, the apparatus 600 provided in this embodiment for implementing memory management includes a processor 61, a memory 62, and a system bus 63. The system bus 63 is used to connect the processor 61 and the memory 62 and implement mutual communication. The memory 62 is configured to store a computer-executable instruction 621. The processor 61 is configured to run the computer-executable instruction 621 to implement the method in any embodiment shown in FIG. 1 to FIG. 4, and implementation principles and technical effects thereof are similar and are not described herein again.

Figure 14:
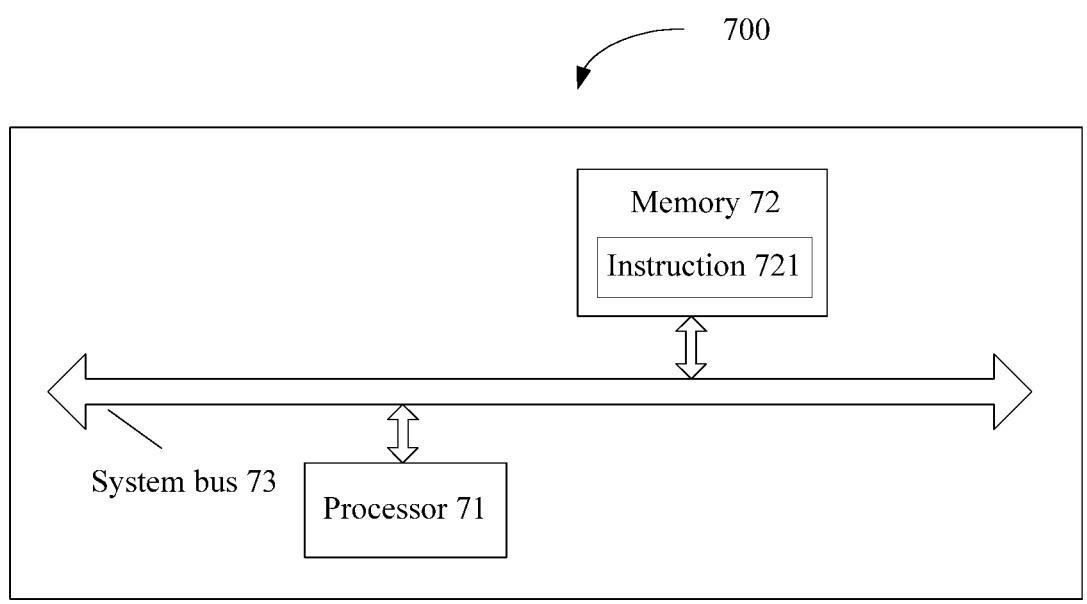
FIG. 14 is a schematic structural diagram of a computer according to an embodiment of the present disclosure.

FIG. 14 is a schematic structural diagram of a computer according to an embodiment of the present disclosure. As shown in FIG. 14, the computer 700 provided in this embodiment includes: a processor 71, a memory 72, and a system bus 73. The system bus 73 is used to connect the processor 71 and the memory 72 and implement mutual communication. The memory 72 is configured to store a computer-executable instruction 721. The processor 71 is configured to run the computer-executable instruction 721 to:

receive address information that is of a to-be-substituted page and sent by a memory manager, and migrate data of the to-be-substituted page from a memory to a free position according to the address information of the to-be-substituted page, where the address information of the to-be-substituted page is sent by the memory manager when dirty data exists in the to-be-substituted page selected for a virtual address carried in a memory access request; and after the data of the to-be-substituted page is migrated from the memory to the free position, notify the memory manager that the to-be-substituted page is available, such that the memory manager changes a virtual address of the to-be-substituted page to the virtual address carried in the memory access request.

When a page fault occurs, the processor 71 is further configured to: receive a page fault notification sent by the memory manager, and preserve a state according to the page fault notification, where the page fault notification is sent when the memory manager determines that a page fault type of the virtual address is an existing data page fault.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

The invention claimed is:

1. A method for memory management, comprising:
receiving, by a memory manager from a computing device comprising a memory comprising an operating system, a first memory access request comprising a first virtual address, wherein the first virtual address is allocated by the operating system to a first process when the operating system invokes the first process;
searching, by the memory manager, for the first virtual address in a translation lookaside buffer (TLB) and the memory;
determining, by the memory manager, a page fault type of the first virtual address when the memory manager does not find a page table entry corresponding to the first virtual address;
allocating, by the memory manager, a first memory page to the first virtual address without generating a page fault interrupt when the page fault type of the first virtual address is a blank-page-caused page fault, wherein the blank-page-caused page fault is a fault where no memory page is allocated to the first virtual address; and
updating, by the memory manager, a page table entry corresponding to the first virtual address to the memory and the TLB, wherein the page table entry comprises a mapping of the first virtual address to a physical address of the first memory page.

2. The method of claim 1, wherein the first memory access request further comprises a process number of the first process, and wherein searching for the first virtual address comprises:
searching, according to the process number, the memory for a memory page corresponding to the first process; and
searching, according to the first virtual address, the memory page corresponding to the first process for the page table entry corresponding to the first virtual address.

3. The method of claim 1, wherein allocating the first memory page to the first virtual address comprises allocating a blank memory page in the memory to the first virtual address, wherein the blank memory page is the first memory page.

4. The method of claim 1, wherein allocating the first memory page to a first virtual address comprises:
selecting a to-be-substituted memory page from allocated memory pages when a blank memory page is not in the memory; and
replacing a virtual address of the to-be-substituted memory page with the first virtual address, wherein the to-be-substituted memory page is the first memory page allocated to the first virtual address.

5. The method of claim 4, wherein before replacing the virtual address of the to-be-substituted memory page with the first virtual address, the method further comprises:
sending address information of the to-be-substituted memory page to the operating system when dirty data exists in the to-be-substituted memory page; and
receiving a notification indicating the to-be-substituted memory page is available, wherein the notification is received after the operating system migrates the dirty data of the to-be-substituted memory page from the memory to a free storage space.

6. The method of claim 4, wherein before replacing the virtual address of the to-be-substituted memory page with the first virtual address, the method further comprises migrating data of the to-be-substituted memory page from the memory to a free storage space according to address information of the to-be-substituted memory page when dirty data exists in the to-be-substituted memory page.

7. The method of claim 1, further comprising:
receiving a second memory access request comprising a second virtual address, wherein the second virtual address is allocated by the operating system to a second process when the operating system invokes the second process;
searching for the second virtual address in the TLB and the memory;
determining a second page fault type of the second virtual address when the memory manager does not find a page table entry corresponding to the second virtual address;
sending a page fault notification to the operating system when the second page fault type of the second virtual address is an existing data page fault, wherein the existing data page fault is a fault where a second memory page has been allocated to the second virtual address and data of the second memory page is in a free storage space;
allocating a third memory page to the second virtual address; and
updating the page table entry in the memory and the TLB and the page table entry corresponding to the second virtual address, wherein the updated page table entry comprises a mapping of the second virtual address to the physical address of the third memory page, and wherein the third memory page comprises the data of the second memory page.

8. The method of claim 1, wherein the computing device further comprises a processor coupled to the memory, and wherein the method further comprises receiving, from the processor, information about a changed processor core when a processor core that executes the first process is changed.

9. The method of claim 1, wherein the computing device further comprises a processor coupled to the memory, and wherein the method further comprises:
receiving a memory freeing instruction from the processor when the operating system ends the first process; and
freeing, according to the memory freeing instruction, memory space occupied by the first process.

10. The method of claim 1, wherein the memory manager is integrated into a memory controller.

11. The method of claim 1, wherein the memory manager is integrated into a buffer scheduler of a message-based memory system.

12. A device, comprising:
a processor;
a memory coupled to the processor; and
a memory controller coupled to the processor and the memory, wherein the memory controller is configured to:
receive a first memory access request from the processor, wherein the first memory access request comprises a first virtual address, and wherein the first virtual address is allocated by an operating system of the device to a first process when the operating system invokes the first process;
determine a page fault type of the first virtual address when the memory controller finds, in a translation lookaside buffer (TLB) and the memory, no page table entry corresponding to the first virtual address;
allocate a first memory page to the first virtual address without generating a page fault interrupt when the page fault type of the first virtual address is a blank-page-caused page fault, wherein the blank-page-caused page fault is a fault where no memory page is allocated to the first virtual address; and
update a page table entry corresponding to the first virtual address to the memory and the TLB, wherein the page table entry comprises a mapping of the first virtual address to a physical address of the first memory page.

13. The device of claim 12, wherein the first memory access request further comprises a process number of the first process, and wherein the memory controller is further configured to:
search, according to the process number, the memory for a memory page corresponding to the first process; and
search, according to the first virtual address, the memory page corresponding to the first process for the page table entry corresponding to the first virtual address.

14. The device of claim 12, wherein the memory controller is further configured to allocate a blank memory page in the memory to the first virtual address, and wherein the blank memory page is the first memory page.

15. The device of claim 12, wherein the memory controller is further configured to:
select a to-be-substituted memory page from allocated memory pages when a blank memory page is not in a second memory; and
replace a virtual address of the to-be-substituted memory page with the first virtual address, wherein the to-be-substituted memory page is the first memory page allocated to the first virtual address.

16. The device of claim 15, wherein the memory controller is further configured to:
send address information of the to-be-substituted memory page to the operating system when dirty data exists in the to-be-substituted memory page; and
receive a notification indicating the to-be-substituted memory page is available, wherein the notification is received after the operating system migrates the dirty data of the to-be-substituted memory page from the memory to a free storage space in the device.

17. The device of claim 15, wherein before replacing the virtual address of the to-be-substituted memory page with the first virtual address, the memory controller is further configured to migrate data of the to-be-substituted memory page from the memory to a storage space according to address information of the to-be-substituted memory page when dirty data exists in the to-be-substituted memory page.

18. The device of claim 12, wherein the memory controller is further configured to:
receive a second memory access request comprising a second virtual address from the processor, wherein the second virtual address is allocated by the operating system to a second process when the operating system invokes the second process;
search for the second virtual address in the TLB and the memory;
determine a second page fault type of the second virtual address when the memory controller does not find a page table entry corresponding to the second virtual address;
send a page fault notification to the operating system when the second page fault type of the second virtual address is an existing data page fault, wherein the existing data page fault is a fault where a second memory page has been allocated to the second virtual address and data of the second memory page is in a free storage space;

allocate a third memory page to the second virtual address; and update the page table entry in the memory and the TLB, wherein the page table entry comprises a mapping of the second virtual address to the physical address of the third memory page, and wherein the third memory page comprises the data of the second memory page.

19. The device of claim 12, wherein the memory controller is further configured to receive information about a changed processor core from the processor when a processor core that executes the first process is changed.

20. The device of claim 12, wherein the memory controller is further configured to:

receive a memory freeing instruction from the processor when the operating system ends the first process; and free, according to the memory freeing instruction, memory space occupied by the first process.

* * * * *